United States Patent
Mansharamani

(10) Patent No.: US 8,484,371 B2
(45) Date of Patent: Jul. 9, 2013

(54) SYSTEM AND METHOD FOR NETWORK BANDWIDTH SIZING

(75) Inventor: Rajesh Mansharamani, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 125 days.

(21) Appl. No.: 13/039,541

(22) Filed: Mar. 3, 2011

(65) Prior Publication Data

US 2011/0219140 A1 Sep. 8, 2011

(30) Foreign Application Priority Data

Mar. 4, 2010 (IN) .............................. 574/MUM/2010

(51) Int. Cl.
*G06F 15/16* (2006.01)

(52) U.S. Cl.
USPC .......................................... 709/232; 709/226

(58) Field of Classification Search
USPC ................................................ 709/232, 226
See application file for complete search history.

(56) References Cited

U.S. PATENT DOCUMENTS

| 6,765,873 | B1 | 7/2004 | Fichou et al. |
| 7,072,295 | B1 | 7/2006 | Benson et al. |
| 7,336,967 | B2 | 2/2008 | Kelly et al. |
| 2008/0221941 | A1 | 9/2008 | Cherkasova et al. |

OTHER PUBLICATIONS

"Approximate Mean Value Analysis for Closed Queuing Networks with Multiple-Server Stations," Suri et al., 2007.*
Suri et al., "Approximate Mean Value Analysis for Closed Queuing Networks with Multiple-Server Stations," *Proceedings of the 2007 Industrial Engineering Research Conference*, 2007, pp. 1-6.

* cited by examiner

*Primary Examiner* — Andrew Georgandellis
(74) *Attorney, Agent, or Firm* — Oliff & Berridge, PLC

(57) ABSTRACT

The present invention relates to a system and method for network bandwidth sizing at a branch level by considering both sizing for throughput and sizing for response times. The invention provides a system and method for bandwidth allocation by performing network capacity planning by applying a model based on Approximate Mean Value Analysis (AMVA). The invention also relates to system and method for bandwidth allocation by performing network capacity planning especially for large enterprises having heavy workloads and diverse applications by applying a model based on Approximate Mean Value Analysis (AMVA).

3 Claims, 3 Drawing Sheets

SYSTEM AND METHOD FOR NETWORK BANDWIDTH SIZING

FIELD OF THE INVENTION

This invention relates to the field of bandwidth sizing of the networking. More particularly, the invention relates to a system and method for network bandwidth sizing at a branch level by considering both sizing for throughput and sizing for response times.

BACKGROUND OF THE INVENTION

Now days many users and administrators access computer network based applications such as on-line shopping, airline reservations, rental car reservations, hotel reservations, on-line auctions, on-line banking, stock market trading via the communication network. Network bandwidth management thus plays a crucial role in ensuring hassle free data transfer for such applications and users. Accordingly, it is important for a service provider (sometimes referred to as "content provider") to provide high-quality uninterrupted services. In order to do so, it has become desirable for such service providers to perform appropriate network bandwidth capacity planning to ensure that they can adequately service the demands placed on their systems by their clients in a desired manner. Thus there arises a need for solutions that ensure that the capacity planning of the network bandwidth is done based upon several factors including workload, priority etc.

Network capacity planning is always a challenge for any enterprise due to changing workloads and applications. For example, in a banking system we can have 30% deposit transactions, 40% withdrawal transactions, and 30% inquiry transactions. First, we need to identify which transaction has more weightage or priority and accordingly one has to plan the capacity of the networks as per changing workloads, applications or transactions. The conventional way of network bandwidth sizing is to look at the overall payload requirement per type of transaction and then budget the bandwidth to manage the transaction throughput. For example, if you have an average of 2 KB data per transaction, and 100 transactions per second, then you need to size for 200 KB/sec or 1.6 Mbps of network bandwidth, outside of network overheads. We refer to this method of sizing as 'Sizing for Throughput'.

This method of network bandwidth sizing usually works for data centers that support thousands of concurrent users. However, one also has to plan bandwidth for the user side of the network. In particular, in scenarios such as banking, financial services, and insurance the organization has a number of branches all over the country or all over the world. The number of users per branch may be of the order of 10 to 50. In such cases the conventional method of sizing for throughput may not work for network bandwidth sizing.

Consider for example the same payload of 2 KB per transaction and a branch with 10 users, on the average submitting a banking transaction once every 50 seconds. Thus we have 10 transactions per 50 seconds, leading to 0.2 transactions/sec. Going by sizing for throughput we need 0.2×2 KB=0.4 KB/sec=3.2 Kbps of network bandwidth at the branch. However, if the service level agreement is an average of 1 second in the network, then even for a single request we need 2 KB/sec=16 Kbps of network bandwidth. In other words, the methodology of sizing for throughput breaks down when we wish to size for response times as well.

Some of the inventions known to us which deals in network bandwidth capacity planning are as follows:

U.S. Pat. No. 6,765,873 filed by Fichou et al describes about a connection bandwidth management process and system for use in a high speed packet switching network. One of the main object of the invention is to provide a connection bandwidth management process and system which rely on an efficient monitoring of the network resources occupancy to re-compute the bandwidth allocated to connections boarded on a given link so that the overall bandwidth capacity of the link is not exceeded, while solving the shortcomings of the conventional oversubscription technique. This patent also describes the network bandwidth allocation based on throughput requirements or traffic requirements. However, the invention fails to present a system/process which considers network bandwidth planning by considering both throughput requirements as well as response time requirements.

U.S. Pat. No. 7,072,295 filed by Benson et al describes about the allocation of bandwidth to data flows passing through a network device. The network bandwidth is allocated to committed data traffic based on a guaranteed data transfer rate and a queue size of the network device and bandwidth is allocated to uncommitted data traffic using a weighted maximum/minimum process. The weighted maximum/minimum process allocates bandwidth to the uncommitted data traffic in proportion to a weight associated with the uncommitted data traffic. However, the invention fails to disclose process/method which performs bandwidth planning rather it proposes a method of bandwidth allocation for the network.

U.S. Pat. No. 7,336,967 filed by Kelly et al describes about a method and system for providing load-sensitive bandwidth allocation. The system, according to one embodiment of the present invention, supports a bandwidth allocation scheme in which the network elements are dynamically assigned bandwidth over the WAN based upon the amount of traffic that the respect network elements have to transmit. The specific bandwidth allocation scheme is designed to ensure maximum bandwidth efficiency (i.e., minimal waste due to unused allocated bandwidth), and minimum delay of return channel data, as described with respect to figures. The scheme is be tunable, according to the mixture, frequency, and size of user traffic. The system ensures that throughput and bandwidth efficiency is preserved during all periods of operations. However, the invention fails to present a system/process which performs planning for network bandwidth by considering both throughput requirements as well as response time requirements.

United States Publication Number 20080221941 filed by Cherkasova et al describes about a system and Method for Capacity Planning for Computing Systems. The capacity planning framework further includes a capacity analyzer that receives the determined workload profile, and determines a maximum capacity of the computing system under analysis for serving the workload profile while satisfying a defined quality of service (QoS) target. However, in this document, it assumes that sufficient network bandwidth is present for allocation to the network. Also, this patent document does not disclose the sizing for network bandwidth.

Suri et al in "Approximate Mean Value Analysis for Closed Queuing Networks with Multiple-Server Stations, Proceedings of the 2007 Industrial Engineering Research Conference" describe about the use of Closed Queuing Networks in modeling various systems such as FMS, CONWIP Material Control, Computer/Communication Systems, and Health Care. Sufi et al (2007) explains how to have efficient and accurate approximate MVA computations for multi server stations. However, in the proposed invention, the inventors have modeled network link as a single server station and can accurately use inverse of MVA to arrive at bandwidth given response time requirements.

All the above mentioned prior-arts fail to recognize the significance of bandwidth planning rather they focus on bandwidth allocation at the branch level for enterprises which have heavy workloads and applications. Also, all existing techniques, methods and processes don't consider the response time constraints.

Thus there exists a need to have a system and method for addressing the network bandwidth sizing at the branch level rather than server level and also should consider both sizing for throughput and sizing for response times for accurate planning of bandwidth allocation of networking for large enterprises which have heavy workloads and applications.

SUMMARY OF THE INVENTION

Before the present systems and methods, enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention.

The primary objective of the invention is to provide a system and method for bandwidth allocation by performing network capacity planning by applying a model based on Approximate Mean Value Analysis (AMVA) algorithm.

Another significant objective of the invention is to provide system and method for bandwidth allocation by performing network capacity planning especially for large enterprises having heavy workloads and diverse applications by applying a model based on Approximate Mean Value Analysis (AMVA) algorithm.

Yet another objective of the invention is to provide a system and method for network bandwidth sizing at the branch level rather than server level.

Yet another objective of the invention is to provide a system and method for accurate bandwidth planning by considering both "sizing for throughput" and "sizing for response" times.

Yet another objective of the invention is to provide a system and method for obtaining an accurate estimate of bandwidth by considering response time constraints using an inverse of AMVA algorithm.

Yet another objective of the invention is to allocate a required bandwidth depending upon the class of transactions, applications after performance of network bandwidth planning.

The present invention proposes a system and method for bandwidth allocation by performing network capacity planning by applying a model based on Approximate Mean Value Analysis (AMVA) algorithm.

In one aspect of the invention, a network bandwidth sizing system comprising at least one branch having two or more client computers connected to a datacenter to send the input to the datacenter (uplink) and to receive the output from the datacenter (downlink); the said datacenter having one central server comprising database server, web server and application server for receiving, storing, processing the input from the user and sending the output to the user through a communication network, wherein the said system characterize in allocating the bandwidth per branch of networks of an enterprise taking in to account both throughput and response time requirements, the said system having processor configured to execute programmed instructions to: Compute a throughput and a think time per class of branch of network of the enterprise based on the user defined input; Compute an initial value for bandwidth per branch of network of the enterprise, which satisfies the throughput requirement, from known throughput of step (a); Compute a feasible value for bandwidth per branch of network of the enterprise, which satisfies the response time requirement, using the Approximate Mean Value Analysis (AMVA); and Compute a final value for sizing bandwidth per branch of network of the enterprise, which satisfies both throughput and response time requirements, using the AMVA.

In another aspect of the invention, a method of planning of allocation of bandwidth per branch of networks of an enterprise taking in to account both throughput and response time requirements, wherein the said method comprising the processor implemented steps of: Computing a throughput and a think time per class of branch of network of the enterprise based on the user defined input; Computing an initial value for bandwidth per branch of network of the enterprise, which satisfies the throughput requirement, from known throughput of step (a); Computing a feasible value for bandwidth per branch of network of the enterprise, which satisfies the response time requirement, using the Approximate Mean Value Analysis (AMVA); and Computing a final value for bandwidth per branch of network of the enterprise which satisfies both throughput and response time requirements using the AMVA.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAIL DESCRIPTION OF THE INVENTION

Figure 1:
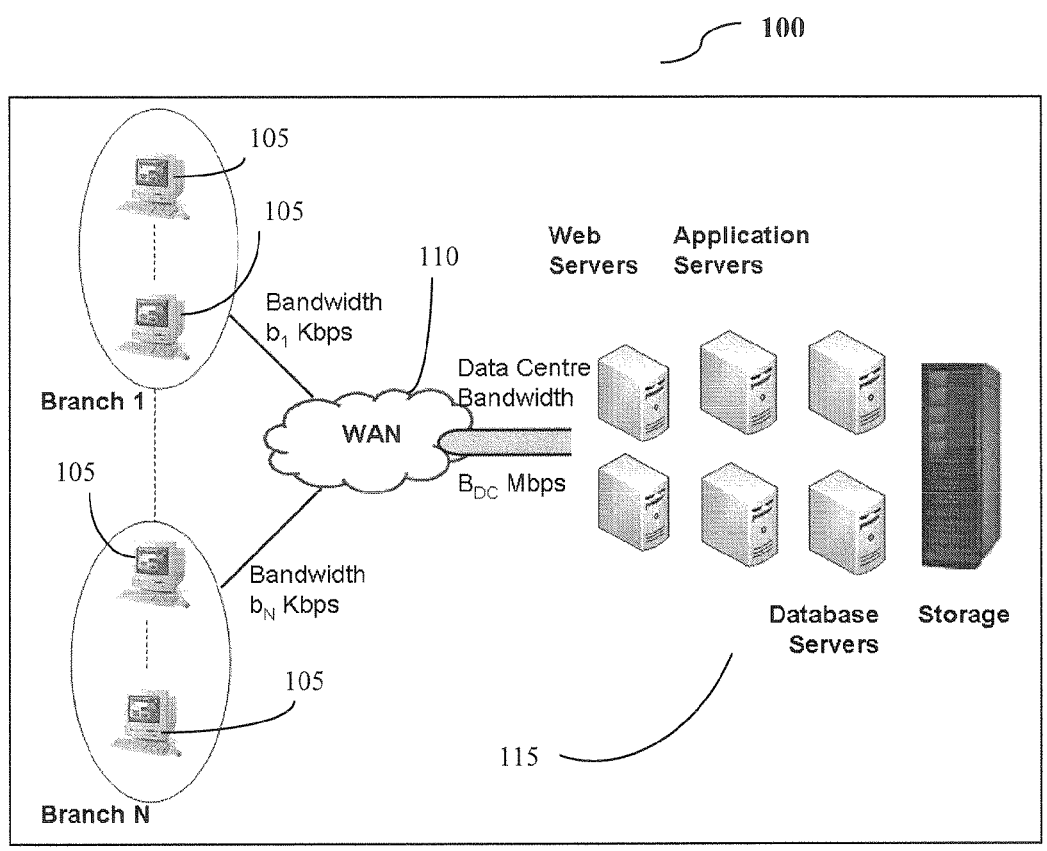
FIG. 1 shows a system architecture for network bandwidth sizing at a branch level by considering both sizing for throughput and sizing for response times according to multiple embodiments of the invention.

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments of the present invention, the preferred methods, and systems are now described. The disclosed embodiments are merely exemplary of the invention, which may be embodied in various forms.

Initially, a system and method of the present invention requires the following inputs for network bandwidth sizing planning:

Uplink: It is referred as when network bytes sent by each transaction from user to data centre as 'bytes sent to host.'

Downlink: It is referred as when network bytes received per transaction from data centre to user terminal as 'bytes received from host.

Round trip latency time ($\tau$): This is the propagation delay on the network link from the user to the data centre and from the data centre to the user. Note that the round trip latency has nothing to do with network bandwidth but it affects response times.

Maximum network link utilization (U): The network utilization should not exceed U.

Number of classes (C): The number of types of transactions or types of users.

Number of concurrent users in branch, per class ($N_i$): For each class we need to know the number of concurrent users. A concurrent user is a user who has a session with the data centre. Even if the session is idle we refer to the user as concurrent.

Average Think time per class ($Z_i$): This refers to the time spent in the user terminal. That is outside of the user waiting for a response. It can be data entry time, idle time, and time spent in viewing output.

Throughput per class ($X_i$): We need to specify either average think or throughput, depending what is most convenient for the user of this methodology. Throughput will be specified as user transactions per second.

Average number of bytes sent to host, per class ($P_{to, i}$): It is also referred to as payload of traffic to the data centre.

Average number of bytes received from host, per class ($P_{from, i}$): It is also referred to as payload of traffic from the data centre.

Message Overhead, per class ($O_i$): Message overhead refers to the number of bytes outside of the application transaction payload, for example, for TCP/IP headers and Http headers. We will refer to $O_i$ as a percentage overhead compared to the payload size. For the sake of simplicity the overhead percentage will be taken to be the same for $P_{to}$ and $P_{from}$ payloads.

Average Number of Round Trips per class ($r_i$): For each transaction class, ri refers to the number of network round trips. This is a function of the application architecture, the underlying protocol, and the network fragmentation.

Average Response Time Target per class ($R_{target,i}$): For each class of transactions, the average response target needs to be specified in seconds.

After giving all these inputs, the proposed system and methodology will compute the overall network bandwidth required on the link from the branch to the data centre. The outputs provided by the system and methodology are:

Total Network Bandwidth Required (B): This is the overall bandwidth on the link from branch to data centre considering in to an account application payload, message overhead, and maximum network utilization target. Note that B will be the minimum bandwidth required to meet the input criteria specified in the list above.

Average Response Time per Class ($R_i$): This is the actual average response time estimates that needs to be compared against the targets, $R_i$, for each class i. Note that we should have $R_i \leq R_{target,i}$ for each class i. For one of the classes this should be equality.

The Network bandwidth will be sized in terms of Kilobits per second (Kbps) or Megabits per second (Mbps). The term KB/sec will refer to Kilobytes per second and MB/sec will refer to Megabytes per second.

Transaction throughput refers to the number of transactions processed per unit of unit, usually transactions per second. Response time of any system refers to the time spent by a request in the system.

FIG. 1 shows a system architecture 100 for network bandwidth sizing at a branch level by considering both sizing for throughput and sizing for response times according to multiple embodiments of the invention. A network bandwidth sizing system 100 comprising at least one branch having two or more client computers 105 connected to a datacenter 115 to send the input to the datacenter 115 (uplink) and to receive the output from the datacenter 115 (downlink), wherein the client computer 115 is connected to the data center by a communication network 110. The said datacenter 115 having one central server comprising database server, web server and application server for receiving, storing, processing the input from an user and sending the output to the user through the communication network 110. The said communication network 110 is selected from Wide area network (WAN), Local Area Network (LAN) or Metropolitan Area Networks (MAN). According to one exemplary embodiment of the invention, the communication network 110 can be WAN. The said system 100 characterize in allocating the bandwidth per branch of networks of an enterprise taking in to account both throughput and response time requirements.

According to another embodiment of the invention, the system provides bandwidth allocation by performing network capacity planning especially for large enterprises for heavy workloads and diverse applications by applying a model based on Approximate Mean Value Analysis (AMVA) algorithm.

The end to end user response time is broken down as time spent in the browser, time spent in the network, and time spent in the data centre. Also, FIG. 1 explains how the transaction/request send from branch computers 105 to data centers 115 through WAN 110 after allocating network bandwidth in a typical scenario.

According to one embodiment of the invention, an average response time across multiple requests is the sum of response times divided by the number of requests. Accordingly, the network bandwidth sizing will be done for a transaction mix comprising of multiple types of transactions. For example, a banking system can have 30% deposit transactions, 40% withdrawal transactions, and 30% inquiry transactions. Each type of transaction may be referred to as belonging to a separate class of transactions. The network bandwidth may be allocated as per the type of transaction or which has more weightage or priority by the system 100.

The above network bandwidth sizing system 100 having processor (not shown in the figure) configured to execute programmed instructions to allocates the bandwidth per branch of networks of an enterprise taking in to account both throughput and response time requirements, wherein the processor is selected from computer, Laptop, PDA or any computing device. According to one embodiment of the invention, the processor can be computer. In the first step of the allocating the bandwidth per branch of networks of an enterprise by the system, the processor configured to execute programmed instructions to compute throughput and think time per class of branch of network of the enterprise based on the user defined input, wherein the user defined input comprises of think time per class or throughput per class. The first step is as explained below:

Step 1: Compute Throughput and Think Time Per Class

As part of input specifications the user specifies think time $Z_i$ per class i or throughput $X_i$ per class i.

If think time $Z_i$ is specified as input by the user, then the throughput can be derived by the processor using Little's Law as:

$$X_i = N_i/(R_i + Z_i)$$

where $N_i$ is the number of users and $R_i$ is the response time for class i.

If throughput $X_i$ is specified as input, then the think time can be derived by the processor using Little's Law as:

$$Z_i = N_i/X_i - R_i$$

In the next step of the allocating the bandwidth per branch of networks of an enterprise by the system, the processor configured to execute programmed instructions to compute an initial value for bandwidth per branch of network of the enterprise, which satisfies the throughput requirement, from known throughput of step 1. The second step is as explained below:

Step 2: Compute Initial Value for Network Bandwidth

The processor needs a starting value for network bandwidth based on which the processor can iteratively estimate the exact value that is looking for. To derive the initial value the processor makes use of the fact that throughput ($X_i$) is known through Step 1, and Utilization (U) is specified as input.

Going by the Utilization Law, $U_i = X_i \, S_i$ for each class i, where $S_i$ is the average service time per class and $U_i$ is the utilization per class i.

Average service time in the network is the average time it takes to transmit or receive the net payload (with overhead) for a request. For request of class i sent from branch to host on the network link the average service time will be:

$$S_i = [P_{to,i} * (1 + Oi/100)]/B_{uplink}$$

Where $B_{uplink}$ is the bandwidth required for sending payload from branch to host. Thus for all uplink bandwidth the processor gets:

$$U_i = X_i * [P_{to,i} * (1 + Oi/100)]/B_{uplink}$$

The input utilization is specified for the overall network link as $$U = \Sigma i U_i = \Sigma i X_i * [P_{to,i} * (1 + O_i/100)]/B_{uplink}$$

The processor therefore gets:

$$B_{uplink} = \Sigma i X_i * [P_{to,i} * (1 + O_i/100)]/U$$

Likewise the processor computes the downlink bandwidth from host to branch as:

$$B_{downlink} = \Sigma i X_i * [P_{from,i} * (1 + O_i/100)]/U$$

Therefore, for the total bandwidth requirement the processor sets the initial value of bandwidth required B as:

$$B = \max(B_{uplink}, B_{downlink})$$

In the next step of the allocating the bandwidth per branch of networks of an enterprise by the system, the processor configured to execute programmed instructions to compute a feasible value for bandwidth per branch of network of the enterprise, which satisfies the response time requirement, using the Approximate Mean Value Analysis (AMVA). The third step is as explained below:

Step 3: Compute Feasible Value for Bandwidth

The bandwidth in step 2 is just an initial value for this methodology. It satisfies the throughput requirement but it may not satisfy the response time requirements. In this step, the processor computes some feasible value for bandwidth that satisfies the response time requirement as well.

To compute response time for a given bandwidth the processor models the system using mean value analysis (MVA). However, MVA is computationally intense and therefore the processor applies the Approximate MVA (AMVA) algorithm to the problem statement.

Table 1 shows the performance model for our problem statement with AMVA applied by the processor.

TABLE 1

AMVA(B, τ, C, N, Z, $P_{to}$, $P_{from}$, O, r, R)
Inputs: B = Network Bandwidth
  τ = Round trip latency
  C = Number of Classes
  N = ($N_1$,...,$N_C$) where $N_i$ is the number of concurrent users of class i
  Z = ($Z_1$,...,$Z_C$) where $Z_i$ is the average think time of class i
  $P_{to}$ = ($P_{to,1}$,...,$P_{to,C}$) where $P_{to,i}$ is the average number of bytes sent from branch to host of class i
  $P_{from}$ = ($P_{from,1}$,...,$P_{from,C}$) where $P_{from,i}$ is the average number of bytes sent from host to branch of class i
  O = ($O_1$,...,$O_C$) where $O_i$ is the average percentage overhead on network payload of class i (same for 'to' and 'from' directions)
  r = ($r_1$,...,$r_C$) where $r_1$ is the average number of round trips of class i
Output: R = ($R_1$,...,$R_C$) where $R_i$ is the average response time of class i
Let K be the number of queueing centres. In this case K=2, one queue for the network uplink and one queue for the network downlink.
Let $D_{i,j}$ be the average service demand of class i at queueing centre j
Let $X_i$ be the throughput of class i
Let $Q_{i,j}$ be the average queue size for class i at queueing centre j
Let $\rho_{i,j}$ be the average response time for class i at queueing centre j
Initialization:
  $D_{i,1} = [P_{to,i} * (1 + Oi/100)]/B$ for i = 1,...,C
  $D_{i,2} = [P_{from,j} * (1 + O_j/100)]/B$ for i = 1,...,C
  $Q_{i,j} = N_i/K$ for i = 1,...,C, for j = 1,2
Computation:
  Repeat $$\rho_{i,j} = D_{i,j}\left[1 + \frac{N_i - 1}{N_i} Q_{i,j} + \sum_{m=1, m\neq i}^{C} Q_{m,j}\right] \text{ for } i = 1,...,C \text{ and } j = 1,2$$

$$R_{i,j} = \sum_{j=1}^{K} \rho_{i,j} + r_i * \tau \text{ for } i = 1,...,C$$

$$X_i = \frac{N_i}{R_i + Z_i} \text{ for } i = 1,...,C$$

$Q_{i,j} = X_i \rho_{i,j}$ for i = 1,...,C and j = 1,2
Until $Q_{i,j}$ converge up to 0.1% tolerance for i = 1,...,C and j = 1,...,2

To compute some feasible bandwidth that satisfies the response time targets specified. For this purpose the processor uses the following steps:

Start with B=(initial bandwidth computed in Step 2)/2
Repeat $B = 2*B$;

Call AMVA (B, τ, C, N, Z, $P_{to}$, $P_{from}$, O, r, R);
Until ($R_i \leq R_{target,i}$ for all i=1, . . . , C)
The processor refers to B as a satisfactory bandwidth if the processor gets:

$R_i \leq R_{target,i}$, for all i=1, . . . ,C

The processor refers to B as a final bandwidth if the processor gets:

$R_i \leq R_{target,i}$ for all i=1, . . . , C and $R_i = R_{target,i}$ for at least one i In the final step of the allocating the bandwidth per branch of networks of an enterprise by the system, the processor configured to execute programmed instructions to computes a final value for bandwidth per branch of network of the enterprise, which satisfies both throughput and response time requirements, using the AMVA. The final step is as explained below:

Step 4: Compute Final Bandwidth

Now, the real bandwidth sandwiched between the values obtained from Steps 2 and 3. The processor uses the following steps to compute the final value of bandwidth.

```
Let B_left = Bandwidth computed in Step 2
Let B_right = Bandwidth computed in Step 3
Repeat
    Set B = (B_left + B_right)/2;
    Call AMVA (B, τ, C, N, Z, P_to, P_from, O, r, R);
    If (B is a satisfactory bandwidth) then
        Set B_right = B;
    else
        Set B_left = B;
    endif
Until (B is a final bandwidth);
```

Now, the processor is successfully computed the final bandwidth B as well as the achieved response times R.

The above proposed system accurately estimates the required bandwidth for a branch of the enterprise by network bandwidth sizing there by considering both throughput and response time requirements. After obtaining the final bandwidth, it gets easier to perform the network capacity planning and costing.

Figure 2:
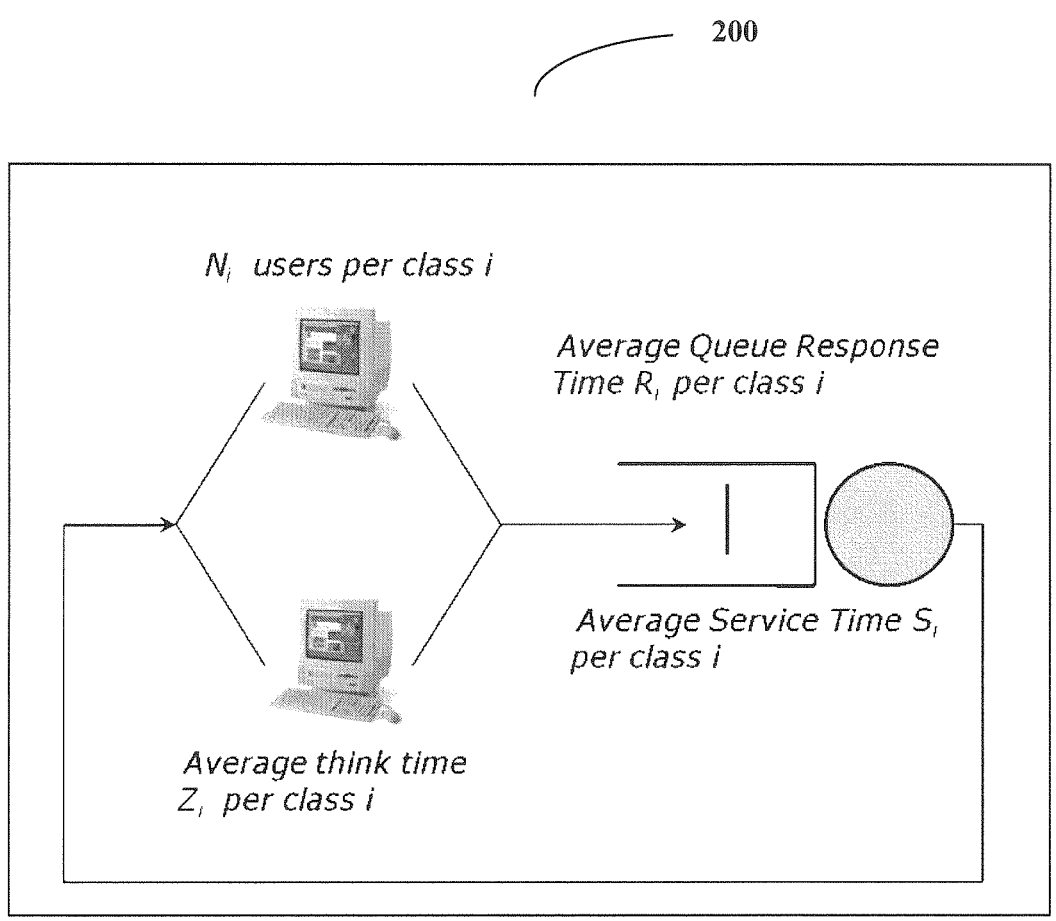
FIG. 2 depicts a closed Queuing Network Model which will be useful for sizing of network bandwidth at a given branch level according to one exemplary embodiment of the invention.

FIG. 2 depicts a closed Queuing Network Model 200 which will be useful for sizing of network bandwidth at a given branch level, where the network link from branch to data centre 115 is modeled as a single multi class queue and it can be assumed. For closed queuing networks the traditional method for solution is that of mean value analysis (MVA). In the multi class scenario the solution gets computationally complex and it is common to use approximate mean value analysis (AMVA). When solving for response times using MVA or AMVA, it can be assumed that service times of queues are to be given as input and response time per class is the output. For the network, unless the processor knows the bandwidth and the processor cannot determine the service time. Further as per proposed methodology, the response time targets are provided. Thus need to inverse the MVA or AMVA methodology to arrive at the required input to meet a given output.

Figure 3:
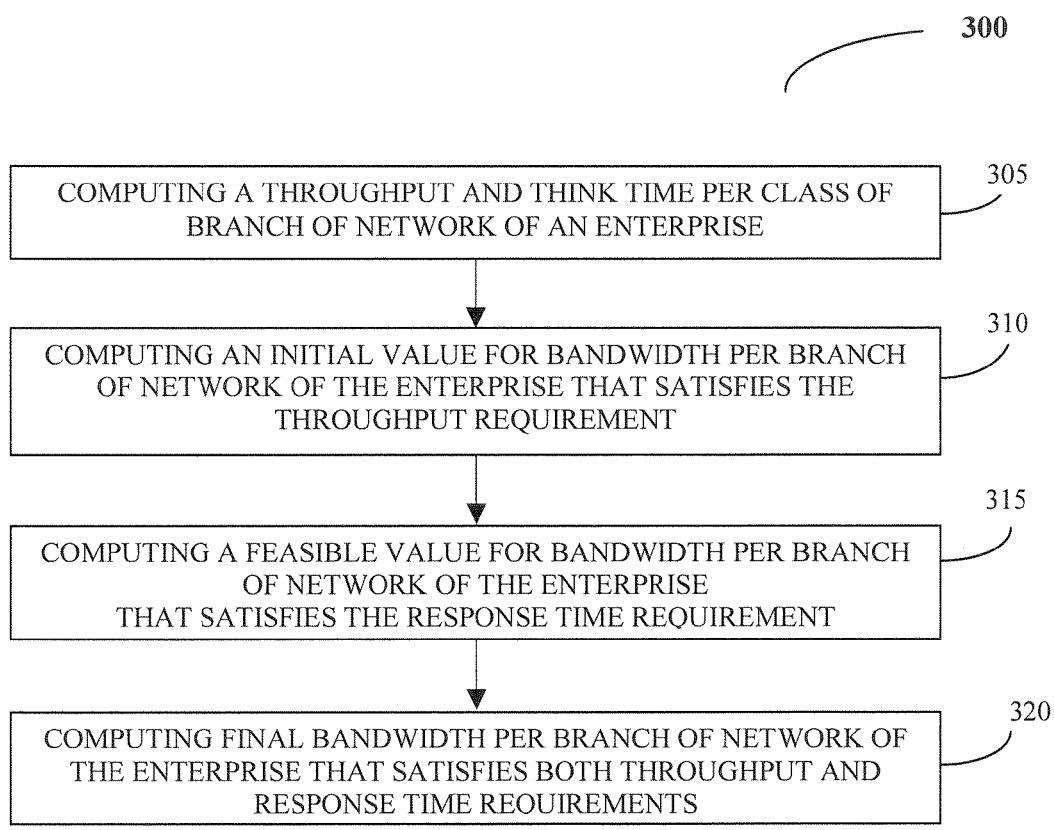
FIG. 3 is a flow chart illustrating the workflow of the invention according to another exemplary embodiment of the invention.

FIG. 3 is a flow chart illustrating the workflow of the invention according to another exemplary embodiment of the invention. A method 300 of planning of allocation of bandwidth per branch of networks of an enterprise taking in to account both throughput and a response time requirements, the said method comprising the various processor implemented steps. Initially a user defined the input to the processor via input means of the processor for computing the final value for bandwidth per branch of network of the enterprise. The input means comprises user interface of the computing device such as computer, PDA, Laptop, or any computing device. According to one exemplary embodiment of the invention, the input means 102 can be a user interface of the computer. The user defined input comprises of think time per class or throughput per class. The processor takes the user defined input and provides the final bandwidth as an output.

The proposed method 300 of planning of allocation of bandwidth can be applied to any kind of the system. According to one exemplary embodiment of the invention, the said system can be enterprise system, wherein the enterprise system 100 comprising at least one branch having two or more client computers 105 connected to a datacenter 115 to send the input to the datacenter 115 (uplink) and to receive the output from the datacenter 115 (downlink), wherein the client computer 115 is connected to the data center by a communication network 110; The said datacenter 115 having one central server comprising database server, web server and application server for receiving, storing, processing the input from an user and sending the output to the user through the communication network 110. The said communication network 110 is selected from Wide area network (WAN), Local Area Network (LAN) or Metropolitan Area Networks (MAN). According to one exemplary embodiment of the invention, the communication network 110 can be WAN.

In the first step 305 of the proposed method, a throughput and a think time per class of branch of network of the enterprise based on the user defined input is computed by the processor, wherein the user defined input comprises of think time per class or throughput per class. The said throughput and the think time per class of branch of network of the enterprise are computed by the processor that is explained above in Step 1.

In the next step 310 of the proposed method, an initial value for bandwidth per branch of network of the enterprise, which satisfies the throughput requirement, from known throughput of step 305 is computed by the processor. The said initial value for bandwidth per branch of network of the enterprise is computed by the processor that is explained above in Step 2.

In the next step 315 of the proposed method, a feasible value for bandwidth per branch of network of the enterprise, which satisfies the response time requirement, using the Approximate Mean Value Analysis (AMVA) is computed by the processor. The said feasible value for bandwidth per branch of network of the enterprise is computed by the processor that is explained above in Step 3.

In the final step 320 of the proposed method, a final value for bandwidth per branch of network of the enterprise which satisfies both throughput and response time requirements, using the AMVA are computed by the processor. The said final value for bandwidth per branch of network of the enterprise is computed by the processor that is explained above in Step 4.

The above proposed method accurately estimates the required bandwidth for a branch of the enterprise by network bandwidth sizing there by considering both throughput and response time requirements. After obtaining the final bandwidth, it gets easier to perform the network capacity planning and costing.

The invention is described in the example given below which is provided only to illustrate the invention and therefore should not be construed to limit the scope of the invention.

A large pharmacy had thousands of stores that needed to connect to a centralized pharmacy system. They had invested in 128 Kbps of bandwidth per store. Any patient walking in to a store went through the following six stages of interaction with the centralized system.

1. Search for patient name: 1 KB sent, 5 KB received over network
2. Search for prescriber: 1 KB sent, 5 KB received
3. Search for drug, 0.5 KB sent, 1 KB received
4. Check for drug suitability, 0.5 KB sent, 1 KB received
5. Payment options, 0.5 KB sent, 2 KB received
6. Check for inventory, 0.5 KB sent, 1 KB received Each interaction had a requirement of 1 sec or less average response time in the network. The initial analysis by consultants predicted that the pharmacy would need to upgrade to 512 Kbps of bandwidth per store, a four fold increase.

The methodology proposed in this document was encapsulated in a Microsoft Excel worksheet. It was modeled as a six user branch with the payload as above. Think times were not available but throughput was 1 transaction per minute or 0.016 per second. Since payloads on the network were different per interaction each interaction was modeled as a separate class with 1 user per class and having average response time requirement of <1 second. Message overheads of 40% were assumed and network round trips of 3 per interaction, with 30 ms latency. Network utilization of 70% was assumed.

The Excel based worksheet calculated that 75 Kbps of bandwidth was sufficient and this helped the pharmacy protect their investment of 128 Kbps. As of today they face no problem with their centralized pharmacy system running of 128 Kbps of bandwidth per store. The worksheet estimated average response time of 1 sec for the first two interactions which had the highest payload. All the other interactions had smaller response times.

The system and method of the proposed invention has various advantages, some of them are as mentioned below:
1) A Network capacity planning can be done accurate especially for large enterprises having heavy workloads and diverse applications; and
2) The invention enables to a system for network bandwidth sizing at a branch level rather than server level by considering both sizing for throughput and sizing for response times.

The preceding description has been presented with reference to various embodiments of the invention. Persons skilled in the art and technology to which this invention pertains will appreciate that alterations and changes in the described structures and methods of operation can be practiced without meaningfully departing from the principle, scope of this invention.

I claim:

1. A network bandwidth sizing system comprising at least one branch having two or more client computers connected to a datacenter to send an input from a user to the datacenter (uplink) and to receive an output from the datacenter (downlink);
the datacenter having one central server comprising a database server, a web server, and an application server for receiving, storing, and processing the input from the user to generate an output and sending the output to the user through a communication network,
wherein the system determines a final value for a bandwidth to be allocated to a branch of a network of an enterprise, the system taking into account both throughput and response time requirements, the system having a processor configured to execute programmed instructions to:
(a) For each class of transaction (i) expected to be conducted over the branch of the network, compute an average throughput $(X_i)$ if a user inputs an average think time $(Z_i)$ or computing the average think time $(Z_i)$ if the user inputs the average throughput $(X_i)$;
(b) Compute an initial value for the bandwidth $(B_{left})$ to be allocated to the branch of the network of the enterprise that satisfies the throughput requirement, using the average throughput $(X_i)$ a computed or input for each class of transaction (i) in step (a) and a maximum network link utilization $(U_i)$ provided by the user as input for each class of transaction (i);
(c) Compute a feasible value for the bandwidth $(B_{right})$ to be allocated to the branch of the network of the enterprise that satisfies the response time requirement, using the average think time $(Z_i)$ computed or input for each class of transaction (i) in step (a) and the initial value computed in step (b) as inputs to an Approximate Mean Value Analysis (AMVA); and
(d) Compute a final value for the bandwidth (B) to be allocated to the branch of the network of the enterprise that satisfies both the throughput and response time requirements using the following steps:
Repeat
  Set $B=(B_{left}+B_{right})/2$;
  Call AMVA $(B, \tau, C, N, Z, P_{to}, P_{from}, O, r, R)$;
  If (B is a satisfactory bandwidth) then
    Set $B_{right}=B$;
  else
    Set $B_{left}=B$;
  endif
Until (B is a final bandwidth).

2. A system as claimed in claim 1, wherein the client computer is connected to the data center by a communication network, wherein the communication network can be selected from Wide area network (WAN), Local Area Network (LAN) or Metropolitan Area Networks (MAN).

3. A method determining a final value for a bandwidth to be allocated to a branch of a network of an enterprise, the method taking in to account both throughput and response time requirements, wherein the method comprises the processor-implemented steps of:
(a) For each class of transaction (i) expected to be carried out over the branch of the network, computing an average throughput $(X_i)$ if a user inputs an average think time $(Z_i)$ or computing the average think time $(Z_i)$ if the user inputs the average throughput $(X_i)$;
(b) Computing an initial value for the bandwidth $(B_{left})$ to be allocated to the branch of the network of the enterprise that satisfies the throughput requirement, using the average throughput $(X_i)$ computed or input for each class of transaction (i) in step (a) and a maximum network link utilization $(U_i)$ provided by the user as input for each class of transaction (i);
(c) Computing a feasible value for the bandwidth $(B_{right})$ to be allocated to the branch of the network of the enterprise that satisfies the response time requirement, using the average think time $(Z_i)$ computed or input for each class of transaction (i) in step (a) and the initial value computed in step (b) as inputs to an Approximate Mean Value Analysis (AMVA); and
(d) Computing a final value for the bandwidth (B) to be allocated to the branch of the network of the enterprise that satisfies both the throughput and response time requirements using using the following steps:
Repeat
  Set $B=(B_{left}+B_{right})/2$;
  Call AMVA $(B, \tau, C, N, Z, P_{to}, P_{from}, O, r, R)$;
  If (B is a satisfactory bandwidth) then
    Set $B_{right}=B$;
  else
    Set $B_{left}=B$;
  endif
Until (B is a final bandwidth).

* * * * *